United States Patent [19]

Carey

[11] 3,966,702

[45] June 29, 1976

[54] PROCESS FOR THE PRODUCTION OF OILSEED ISOLATES

[75] Inventor: Paul L. Carey, St. Louis, Mo.

[73] Assignee: Ralston Purina Company, St. Louis, Mo.

[22] Filed: Nov. 22, 1974

[21] Appl. No.: 526,181

Related U.S. Application Data

[63] Continuation-in-part of Ser. No. 379,519, July 16, 1973, abandoned, which is a continuation-in-part of Ser. No. 246,941, April 24, 1972, abandoned.

[52] U.S. Cl. ............................ 260/123.5; 426/422; 426/656
[51] Int. Cl.² ........................................... A23J 1/14
[58] Field of Search .................. 426/148, 422, 656; 260/123.5

[56] References Cited
UNITED STATES PATENTS

| | | | |
|---|---|---|---|
| 2,397,307 | 3/1946 | Youtz | 260/123.5 |
| 3,043,826 | 7/1962 | Beaber et al. | 260/123.5 |
| 3,493,385 | 2/1970 | Hack | 426/424 |

*Primary Examiner*—James R. Hoffman
*Attorney, Agent, or Firm*—W. Dennis Drehkoff

[57] ABSTRACT

A novel protein isolate derived from vegetable oilseed protein is disclosed that is substantially free of impurities. More particularly, a novel soy protein isolate is disclosed which is substantially devoid of color and lacks the characteristic "beany" flavor of soybeans. The protein isolate is produced by extracting a ground oilseed material, such as soybean meal, with an alkaline extractant to provide an alkaline protein extract with a pH of at least about 9.5, passing the alkaline extract through activated carbon to deflavorize and decolorize the protein material, followed by precipitation and isolation of the deflavorized protein.

38 Claims, No Drawings

PROCESS FOR THE PRODUCTION OF OILSEED ISOLATES

This application is a continuation-in-part of application Ser. No. 379,519 filed July 16, 1973, which is a continuation-in-part of application Ser. No. 246,941, filed Apr. 24, 1972, both now abandoned.

BACKGROUND OF THE DISCLOSURE

The instant invention generally relates to a process for the production of a protein product and more specifically to a soybean protein product of improved flavor characteristics.

This invention was conceived and developed largely for soy materials because of the special problems encountered with such materials. Therefore, it will be explained largely with respect to soy materials, and has special application to such materials, although it can be used for other oilseed protein materials in the broader aspects of the invention.

Generally, in the use of protein products derived from vegetable protein sources such as soybeans, the biggest problem in achieving wide acceptance of these products is the presence of an inherent "beany" flavor and odor. Even with various processing techniques which involve the purification and isolation of the protein from soybeans, these procedures are unable to completely eradicate this characteristic "beany" flavor. Furthermore, although a rendered protein product may apparently lack this characteristic odor, when the protein product is included in a food product such as a milk or beverage and heated, this undesirable flavor has a tendency to reappear, thus requiring a high percentage of strong flavorants to completely mask the "beany" taste. Therefore, although various processing techniques have been partially successful in eliminating this undesirable flavor from protein products derived from soybeans, nevertheless a need still exists for a solution to this problem.

One of the more common products derived from vegetable protein sources such as soybeans, is referred to as a "protein isolate" in that most of the available protein is isolated to yield a product having a protein content on the order of 95 percent or higher. The basic process for producing the isolate comprises dispersing ground, defatted soybeans in a strongly alkaline solution, followed by the addition of acid to lower the pH of the extract to the isoelectric point of the protein, which is between about 4 and 5. The precipitated protein or curd is then collected and the whey or excess liquor discarded, after which it is washed and may be dried, if desired, by spray drying or similar techniques. Even after this extensive degree of processing, the soy protein isolate for the most part, suffers from the flavor problems noted above.

As previously noted, there have been various attempts to improve the flavor of soybean isolates, and at the same time, decolorize them as much as possible. The whiter the product, the more desirable it is in the formulation of simulated milks, or as a whitener for coffee, or as a fortifying protein source for food products in general. Generally, however, while a single prior art process might have been more successful than another in eliminating undesirable flavor, it would correspondingly suffer from a deficiency with regard to color, therefore, requiring additional processing to eliminate this.

Various prior art processes have employed absorbants such as fullers earth, clay, or activated carbon in an attempt to decolorize proteins. For example, U.S. Pat. No. 3,493,385 suggests the treatment of protein hydrolysates with activated carbon to remove color, while U.S. Pat. No. 1,165,199 suggests that bone black can be used to lighten soy milk and U.S. Pat. No. 2,397,307 suggests that soy protein can be decolorized with activated carbon. In the latter two situations, however, it is specifically indicated that either the addition of flavorants is needed, or that decolorizing by this route has failed to produce a protein of the necessary quality and light color. Therefore, no one has successfully employed activated carbon to successfully deflavorize, decolorize and deodorize the soy protein or any of its proteinaceous extracts.

The present invention is also concerned with the removal of impurities, from various other vegetable oilseed materials. Techniques have been shown in prior art processes for the removal and detoxification of aflatoxins from oilseed material. U.S. Pat. No. 3,493,385 suggests the use of a short-arc mercury lamp to detoxify aflatoxin while U.S. Pat. No. 3,515,736 suggests that aflatoxin can be extracted from peanut meal with an azeotropic mixture of acetone, hexane and water. No one has suggested the use of activated carbon to remove aflatoxins from oilseed material such as peanut and cottonseed meal.

SUMMARY OF THE INVENTION

It has now been determined that a protein isolate may be produced from oilseeds which is substantially free of impurities by treating the protein rich alkaline extract of solvent extracted ground oilseeds with activated carbon. The treated extract can then be handled by a number of different processing techniques to yield a protein isolate which can then be used as protein fortifying material or as a base for a variety of protein rich foods.

More specifically, the instant invention involves preparing an alkaline extract of a defatted soybean meal by dispersing the meal in an alkaline solution with a pH of at least about 8.5 to solubilize substantially all of the protein, followed by the removal of insoluble matter, after which the alkaline extract is poured through a column of activated carbon to provide a substantially colorless, alkaline protein extract. Thereafter, the solubilized protein can be precipitated by lowering the pH to the isoelectric point of the protein or about 4.5, at which time the curd or isolate can be washed, and thereafter treated by spray drying or similar techniques to provide a bland, odorless, substantially white protein material which is suitable for a variety of food applications.

DESCRIPTION OF THE PREFERRED EMBODIMENTS

The starting material for the production of the novel protein product of the instant invention comprises ground or finely comminuted soybeans from which substantially all of the oil has been removed. Although the percentage of residual oil which remains in the ground soybeans is not intended to be a limiting factor, nevertheless, this will typically be below about 5 percent by weight and usually about 0.5 to 2 percent by weight depending on the technique used to remove the oil. Again, the manner in which the oil is removed is not intended to be a limiting factor, with any of the techniques which are known to those skilled in the art being suitable.

The ground, defatted, soybean material is then extracted with an alkaline extracting agent which comprises a food grade water soluble alkali such as sodium, calcium, potassium and magnesium hydroxide, or alkaline salts such as sodium carbonate or bicarbonate, including mixtures of salts and alkali. The particular normality of concentration of alkali in the extractant is not intended to be a limiting factor, although the alkaline extract of the soybean meal or flakes should have a pH of at least about 8.5 and preferably above 9.5 as hereinafter described. The flakes are typically dispersed in water at a weight ratio, flakes to water of either between about 1 to 10 or 1 to 16, and the temperature of the water is maintained at between about 65° to 110°F., and preferably about 85°F. Thereafter, the alkaline extract is added so that the pH of the aqueous medium is at least about 8.5, although preferably above 9.5, and as a more preferred range of operation, 10 to 10.5. When the pH of the extract is maintained above this minimum level, undesirable flocculation of the protein will occur when the extract is added to the column of activated carbon, thereby interfering with recovery of the protein, and as a consequence, efficiency of the column. Maintenance of the above range of aqueous medium to defatted flakes typically provides a preferred percentage of between about 3 to 5 percent dissolved solids in the alkaline extract for use on the column.

The flakes are extracted with alkali for a period of time which is typically about 30 minutes, after which it is centrifuged to remove the spent or extracted flakes. The extract is thereafter clarified by filtration or centrifugation to provide a clarified alkaline extract of the ground soybeans with a preferred pH of at least about 9.5 having a solids content of between about 3 to 5 percent by weight. While not limiting, various additives may be employed in the extraction of the soybean flakes if desired, to improve extraction efficiency or otherwise improve or effect the functional properties of the protein isolate. Typical materials in this category would include sulfite salts, or other additives. The clarified alkaline extract is then ready for purification with activated carbon as hereinafter described.

The particular type of carbon which can be employed in the instant process is not intended to be a limiting factor in the instant invention and one skilled in the art could readily select the type to be employed from those commercially available, giving close consideration to the protein recovery and activity of the carbon.

Among the variables to be considered in choosing a particular activated carbon for use in the instant process include the pore size and the size of the individual particles of activated carbon. The pore size controls the size of the molecules adsorbed. There are two types of pores referred to in activated carbon adsorption technology, for example macropores which are those pores having a diameter larger than 1,000 angstroms and micropores which are those pores ranging in size from 10 to 1,000 angstroms. The macropores are generally available only at the immediate exterior surface of the carbon particle. These macropores are part of, and lead to interconnecting passageways of smaller openings of varying sizes which fall into the micropore size classification. In the situation where there are different size molecules in solution, these different molecules compete with each other for adsorbant surface. Because of the irregular shape of both pores and molecules and, also, by virtue of constant molecular motion, the micropores are not blocked by the large particles but are still available for entry by smaller molecules. Also, the greater mobility of the smaller molecules permit them to diffuse faster than the large molecules and penetrate the micropores before they are blocked.

The ultimate pore sizes for the activated carbon, for purposes of this invention, should typically be one in which all of the macropores were sufficiently small to block the uptake of the protein and the micropores were sufficiently large to adsorb all of the nonprotein contaminants. At this point, however, knowledge of the impurities and the soy protein structure and size is extremely limited and this theory of operation is not intended to be limited.

The other important qualitative variable is particle size. This affects the rate of adsorption, i.e., as the particle size decreases, the rate of adsorption increases. However, the particle size does not affect surface area of adsorption. There are other variables relating to the quality of carbon such as hardness which relates to its resistance to abrasion rather than to its effectiveness in a particular system. These variables are well known to those skilled in the art.

It is preferred that the activated carbon have a low ash content and as a consequence a relatively low calcium content, to prevent possible absorption of the protein. In this regard, an activated carbon with an ash content below about 8 percent by weight is preferred. If desired, however, an activated carbon with an ash content above this level may be employed by washing the activated carbon with an acid medium prior to employing it with the alkaline protein extract in order to remove excess calcium or materials that could absorb the protein. The particular type of carbon in this respect, however, is not intended to be a limiting factor in the instant invention, since either are entirely operative depending on the particular results desired.

Typical activated carbon materials which are operative in the instant invention, although the following is not intended to be limiting, include those granular activated carbons bearing trademark designations of "BPL," "CPG," "SGL," "CAL," and "OL" produced by Pittsburgh Activated Carbon Company, a division of Merck & Company, Rahway, N.J. The listed types of carbons have maximum ash contents on the order of 8 percent or less and are entirely suitable for purification of the alkaline protein extract of the instant invention.

The particular arrangement or type of apparatus used for purification of the alkaline extract of the instant invention is not intended to be limiting insofar as the instant process since any of these variations in arrangement of or type of apparatus is well known to those skilled in the art. However, one could, depending on choice of apparatus or the particular arrangement of it, typically construct a batch, semi-continuous or continuous system for purification of the alkaline protein extract as hereinafter described.

A batch process is, for example, intended to describe the simplest arrangement of apparatus for carrying out the instant process in that a single column is constructed containing the particular activated carbon, and the alkaline protein extract is placed directly on this column and allowed to pass through the column, thereby deodorizing, decoloring and deflavoring the protein extract. At this point, however, the column is unusable for further operation and requires replacement of the activated carbon or regeneration of the existing material before a second batch of an alkaline protein extract may be purified. In the batch type of process, the particular amount of activated carbon that is to be employed is not intended to be a limiting factor since this is entirely dependent on the volume of the alkaline protein extract. Furthermore, insofar as passing the protein extract through the column of activated carbon, the extract can be passed down through the carbon, in other words the extract is placed on top of the activated carbon absorbant and pulled through by gravity. While this method is entirely suitable in the batch type of process as well as in any of those processes which are hereinafter described, it is nevertheless preferred in the instant process that the extract pass through the carbon by flowing up through the absorbant, or opposite to the force of gravity. This reduces the possibility of unwanted impurities contaminating the purified extract when the absorption properties of the carbon is exhausted. The driving force for elution through the absorbant in either manner can be provided by pressure to force the extract through the column thereby removing the undesirable materials in the protein extract.

Other and preferred systems for purification of the alkaline protein extract of the instant invention are semicontinuous systems which are more suitable for commercial operation. These processes generally provide for regeneration or replacement of the activated carbon without a substantial interruption in purification of the alkaline protein extract. Typical systems which provide for replacement or regeneration of the activated carbon include a static bed or multiple column system, and a pulsing bed or moving bed system.

The pulsing bed or moving bed system refers to a single column system in which the exhausted carbon is continually replaced. In a system of this type, the flow of liquid is up through the bed of carbon, while the carbon advances periodically down the column. Thus, the extract is introduced at the bottom of the column and the fact that the liquid flow is up permits frequent removal of small amounts of spent or exhausted carbon from the bottom of the column while at the same time making corresponding additions of fresh carbon to the top of the column. Operation of the column in this manner provides a counter current method of operation which means that the partially exhausted activated carbon particles are absorbing impurities before the semi-processed effluent comes into contact with fresh carbon thereby utilizing the maximum absorptive capacity of the activated carbon.

The static bed or multiple column system also prermits a counter-current method of operation thereby insuring that the absorptive properties of the carbon are most effectively utilized. In this system, multiple columns are filled with activated carbon and arranged in a series thereby permitting the first column to become saturated with impurities or exhausted while the solution of desired purity is obtained from the final column. At this point, the first column is emptied of exhausted carbon, replenished with fresh carbon and placed in the "downstream" position, or below the column which has already been used. This permits counter-current operation in that the solution comes into contact with the semi-exhausted carbon first before contacting the fresh carbon. Any of the above described processes provide suitable systems for purification of the alkaline protein extract of the instant invention, to yield a protein product that has no undesirable flavor, odor or color. The spent carbon can be regenerated and reused if desired by removing excess water by a variety of well known mechanical means, such as centrifugation, followed by thermal regeneration of the carbon in a furnace of temperatures of 850° to 1000°C. After firing, the regenerated carbon is quenched in water or diluted alkali at which point it can be dried or returned to the column.

After the alkaline protein extract has passed through the activated carbon, the resultant purified extract or liquor is then subjected to a precipitation step to precipitate the soy protein. The soy protein is precipitated from the liquor by lowering the pH to an acidic value near or at the isoelectric point of the protein, usually a pH of 4.6 – 4.9 with the addition of a common food grade acidic reagent such as acetic acid, phosphoric acid, citric acid, tartaric acid or others. The precipitate is then separated by centrifuging, and washed with water, and is observed to a fluffy, white appearing material with minimal odor and flavor.

Following this, the damp curd can be reslurried with water if desired and the pH of the slurry adjusted to a more neutral condition of between about 6 and 7 having a solids content of between about 15 to 23 percent by weight. After which the suspension can be spray dried to a whitish powder which lacks the residual taste, flavor, and impurities of soybeans.

When the term "impurities" is used in the disclosure it refers not only to the undesirable flavors and colors found in soybean material but also to a fungal metabolite, usually referred to as aflatoxin, found in peanut and cottonseed material.

The following Examples describe specific embodiments of the instant invention.

EXAMPLE 1

Defatted soybean flakes of 90 pounds were suspended in 900 pounds of water containing 1.7 pounds of calcium hydroxide and 1.35 pounds of sodium sulfite. The mixture was held at a temperature of 85°F. and extracted for 30 minutes. Following extraction, undissolved solids and the spent flakes were removed from the mixture by centrifugation. After this, the suspension was clarified by centrifugation to provide 1436 pounds of an alkaline protein extract having a pH of 10.2.

The above alkaline protein extract was fed onto a column of activated carbon prepared as follows: a stainless steel column 14 inches in diameter and 20 feet long was filled with No. 1440 mesh CPG granular activated carbon, available from Pittsburgh Activated Carbon Co., a division of Merck & Co., Rahway, N.J., to a depth of 15.5 feet. The column was preconditioned with 0.1 N sodium hydroxide until the effluent had a pH of about 10.2 and then back washed with water to reduce the fines in activated carbon. The alkaline protein extract was then fed through the column at a rate of 1 gallon per minute per square foot and the effluent collected.

The effluent was adjusted to pH 4.5 with phosphoric acid to precipitate the protein. The water was removed, and the curd washed once with an equal weight of water. After removal of the water, the curd was resuspended in water to produce a suspension having a solids content of about 18 percent, after which it was spray dried to yield a whitish protein powder having essentially a bland flavor, with a whiter color than soy isolate processed in a conventional manner.

EXAMPLE 2

Twenty pounds of defatted soybean flakes were suspended in 320 pounds of water which contained 182 grams of calcium hydroxide (2 percent by weight) and 91 grams of sodium sulfite (1 percent by weight). The mixture was held at a temperature of 85°F. and extracted for 30 minutes. Following extraction, undissolved solids and the spent flakes were removed from the mixture by centrifugation. After the undissolved solids were removed, the suspension was clarified by centrifugation to provide 301.8 pounds of an alkaline protein extract having a pH of 10 to 10.3.

To determine possible difference between the protein isolate of the instant invention and insolate produced in a conventional manner, the alkaline extract was split into two portions. One portion was processed in the manner set out below as Method A, which is a conventional process of producing a protein isolate from soybeans and the second portion processed in the manner set out in Method B pursuant to the process of the instant invention.

METHOD A

The 165 pound portion of alkaline extract was lowered to a pH of 4.5 by the addition of phosphoric acid, to precipitate the protein in the form of a damp curd, an equal weight of water was added to wash the curd, after which the mixture was centrifuged and the wash discarded. A sample was taken of the curd after the single washing step and designated as Sample 1. The washing step was repeated again and a sample of the curd was taken after the second washing step and designated as Sample 2. The washing step was then repeated a third time on the balance of the curd, and a sample was taken after the third washing step and designated as Sample 3. Moisture analyses, solids analyses on the wet material and protein analyses on both the wet and dried protein product were completed. This data is set out in Table 1 below.

METHOD B

A 62 liter portion of alkaline extract at a pH of 10 to 10.3 was fed into a column of activated carbon prepared as follows: a stainless steel column 2 inches in diameter and 7 ½ feet long was filled with 2,085 grams of No. 1440 mesh of CPG granular activated carbon, available from Pittsburgh Activated Carbon Co., a division of Merck & CO., Rahway, N.J. The column was preconditioned with about 3,000 ml. of 0.1 N sodium hydroxide until the effluent had a pH of betwen 10 to 11. The alkaline extract was then fed through the column at a rate of 150 ml. per minute and the effluent collected. The pH of the column effluent was adjusted to 4.5 with phosphoric acid to precipitate the protein. The water was removed, and the curd was washed once with an equal weight of water after which the water was removed. Approximately 4,600 grams of wet curd was obtained and moisture and solids analyses on the wet material and protein analyses on both the wet and the dried isolate were completed. These results are set out in Table 1.

Table 1

| Sample of Isolate | % Moisture | % Protein (wet) | % Protein (dry) |
|---|---|---|---|
| 1 | 82 | 16.5 | 91.7 |
| 2 | 80.8 | 17.8 | 92.7 |
| 3 | 81.5 | 17.8 | 96.2 |
| Carbon Column | 81.2 | 18.0 | 95.7 |

The observation was further made that the isolate produced pursuant to the process of the instant invention was of a whiter color and blander flavor than Samples 1, 2 and 3. It may, therefore, be seen from the above data, that the protein isolate obtained by purification with the carbon column, matches the isolate produced in a conventional manner for protein content and yet has a much blander flavor and a significantly whiter color than the isolate that was subjected to as many as three washing steps, which is a conventional means of removing undesirable flavor and color.

EXAMPLE 3

30 pounds of defatted soy flakes was dispersed in an aqueous medium maintained at 86°F., containing 480 pounds of water, 126 grams of sodium sulfite (1 percent by weight), and 372 grams of calcium hydroxide (2 percent by weight). The mixture was maintained at the above temperature and extracted for 30 minutes. Following extraction, the undissolved solids and spent flakes were removed from the mixture by centrifugation. After the undissolved solids were removed, the suspension was clarified by centrifugation to provide an alkaline protein extract with a pH of 10.7 to 10.8. The alkaline extract was split into two portions of 90 pounds each, and one portion was processed in the manner set out below as Method A, which is a conventional method of producing a protein isolate from soybeans. The second portion was processed in the manner set out in Method B pursuant to the process of the instant invention.

METHOD A

The 90 pound portion of alkaline extract was adjusted to a pH of 4.5 by the addition of 85 percent phosphoric acid to precipitate the protein in the form of a damp curd. The curd was washed with an equal weight of water, and the mixture was centrifuged and the wash discarded. Following washing, 2,990 grams of curd was recovered having a solids content of 27 percent, a moisture content of 77 percent, and a protein content of 21.1 percent. The pH of the curd was adjusted to 4.8, and the solids content reduced to 18 percent after which the curd was spray dried to produce a protein isolate for flavor and color evaluation as set forth below in Table 2.

METHOD B

The 90 pound portion of the alkaline extract at a pH of 10.7 to 10.8 was fed into a column of activated carbon prepared as follows: a stainless steel column 2 inches in diameter and 7 ½ feet long was packed with 2085 grams of No. 1440 mesh CPG granular activated carbon, available from Pittsburgh Activated Carbon Co., a division of Merck & Co., Rahway, N.J. The column was preconditioned with about 3000 ml. of 0.1 N sodium hydroxide until the effluent had a pH of between 10 to 11. The alkaline extract was then fed through the column at a rate of 88 ml. per minute and the effluent collected. The pH of the column effluent was adjusted to 4.5 with phosphoric acid to precipitate the protein. The water was removed, and the curd was washed once with an equal weight of water after which the water was removed by centrifugation. Following washing, about 3330 grams of curd was recovered having a solids content of 20 percent, a moisture content of 81.6 percent, and a protein content of 17.9 percent. The pH of this curd was adjusted to 4.8 and the solids content reduced to 18 percent, after which the curd was spray dried to produce a protein isolate for flavor and color evaluation as set forth below in Table 2.

The dried protein isolates produced pursuant to Method A, a conventional processing technique and Method B of the instant invention were evaluated for flavor and color.

Table 2

| Sample | Color | Flavor |
| --- | --- | --- |
| Method A | 0 | Strong beany Flavor, characteristic of soy. |
| Method B | 6 | Bland, relatively tasteless product. |

The color and flavor evaluations were subjectively measured with a scale of 0 to 6 employed for color evaluation with 0 being the yellowest and 6 the whitest. It may readily be seen that the product of the instant invention is strikingly better than conventional protein isolate both with regard to flavor and color.

EXAMPLE 4

The protein isolates produced in Example 3 pursuant to conventional Method A and Method B of the instant invention, were further evaluated for differences in flavor characteristics by dispersing them at 5 percent by weight in water followed by adjustment of the pH of the dispersion to 6.8 with sodium hydroxide. Each sample was submitted to eight members of a taste panel and the flavor rated for blandness on a hedonic scale of 0 to 6 with 6 being the most bland. Three tasters preferred the sample produced pursuant to Method A and four tasters preferred the sample from Method B. One taster did not find any difference between them. The hedonic rating of the sample produced pursuant to conventional Method A was 3.7 while that of the sample of Method B was 4.1. Thus, the above data clearly indicates that even in an extremely dilute solution, the difference in quality between the product of the instant invention and a product of the prior art is evident to a taste panel.

EXAMPLE 5

To evaluate flavor differences between conventional soy isolate and that of the instant product in a food product, the protein isolate produced in Example 3 pursuant to Method A and Method B were used to provide the protein source for an imitation milk product. The formula for the milk is as follows:

| Ingredient | % by Wt. |
| --- | --- |
| Soy Protein Isolate | 3.5 |
| Hydrogenated Coconut Oil | 3.5 |
| Corn Syrup Solids (36 D.E.) | 6.0 |
| Dicalcium phosphate | 0.1 |
| Propylene glycol alginate | 0.1 |
| Emulsifier (polyoxyethylene Sorbitan Monostearate, mono and diglycerides) | 0.1 |
| Water | 86.7 |

The imitation milk using both protein isolates was subjected to a taste panel of 14 members and 8 panel members preferred the imitation milk with the isolate of Method B, while 4 preferred the imitation milk with the isolate of Method A. Two members indicated no preference between the two samples. The hedonic rating based on a scale of 1 to 10, with 10 being the most preferred, of the milk containing the isolate of Method A was 5.1 while the milk containing the isolate of Method B was 5.4. The improved blandness of the product of the instant invention over prior art products is thus fully apparent when both are employed in a food product.

It has been shown that fungal metabolites, elaborated by members of the mold genus *Aspergillus*, particularly *A. flavus*, propagating on protein containing substrates such as vegetable oilseed meals are very toxic to poultry and fish, and can lead to disease. In fact, these fungal metabolites, usually referred to in their crystalline form as aflatoxins, have proven to be carcinogenic to some life forms. The process of the instant invention can be utilized to extract aflatoxins and other undesirable impurities from various oilseeds, such as peanut and cottonseed.

EXAMPLE 6

*Aspergillus flavus* was cultured in cottonseed meal and the meal subsequently defatted with hexane. The aflatoxin content of the cottonseed meal was 1350 ppb of type $B_1$ and 111 ppb of type $B_2$. Six hundred-fifty grams of the defatted flakes were milled to a flour consistency and suspended in 6500 ml. of water which was adjusted to a pH of 10.3 with 50% sodium hydroxide. The mixture was held at ambient temperature and extracted for 30 minutes. Following extraction, undissolved solids were removed from the mixture by centrifugation. After the undissolved solids were removed, the suspension was clarified by centrifugation to provide 4988 grams of an alkaline extract having a pH of 10.3. The alkaline extract was split into two portions, and one portion was processed in the manner set out below as Method A, which is a conventional method of producing a protein isolate from vegetable oilseeds. The second portion was processed in the manner set out in Method B pursuant to the process of the instant invention.

METHOD A

The first portion, consisting of about 740 gram of alkaline extract was adjusted to a pH of 4.6 by the addition of 85 percent phosphoric acid to precipitate the protein in the form of a damp curd. The curd was dried and evaluated for aflatoxin content. The aflatoxin content is measured by a method shown at Sections 26.031 – 26.039, *Official Method of Analysis, Association of Analytical Chemists*, 11th Edition, 1970. The results of these measurements are set forth in Table 3 and are identified as (A).

METHOD B

The 3771 gram portion of the alkaline extract at a pH of 10.3 was fed into a column of activated carbon.

Approximately 375 grams of 12 × 30 mesh BPL granular activated carbon, available from Pittsburgh Activated Carbon Co., a division of Merck & Co., Rahway, N.J., was packed in a stainless steel column 5 cm. in diameter and 50 cm. long. The column was preconditioned with about 300 ml. of 0.1 N sodium hydroxide until the effluent had a pH of between 10 to 11. The alkaline extract was fed through the column at a rate of 40 ml. per min. and the effluent collected in two successive 1000 ml. fractions. The pH of each column effluent fraction was adjusted to 4.6 with phosphoric acid to precipitate the protein. Each fraction is mixed with about 10 ml. chloroform. The curd was dried and evaluated for aflatoxin content. The aflatoxin content was measured by the same procedure shown in Method A. The results of these measurements are set forth in Table 3 and are identified as (B) and (C).

TABLE 3

| | Sample | Aflatoxin Content | | | |
|---|---|---|---|---|---|
| | | Type $B_1$ µ/g per Kg flour | Percent by Weight | Type $B_2$ µ/g per Kg flour | Percent by Weight |
| (A) | Initial Flour | 1350 | | 111 | |
| | Untreated Isolate | 2278 | 100 | 148 | 100 |
| (B) | Carbon Column Isolate | 153 | 6.7 | 7 | 4.7 |
| (C) | Carbon Column Isolate | 180 | 7.9 | 10 | 6.7 |

It may readily be seen that the isolate product of the instant invention has a substantial reduction of aflatoxin content when compared with the control cottonseed isolate product (A).

EXAMPLE 7

A peanut sample was prepared from a 100 lb. lot of "pick outs" received from a peanut blanching company. The nuts were first passed through cracking rolls and then through flaking rolls, then extracted in a basket extractor at ambient temperatures with hexane. The aflatoxin content was 580 ppb of type $B_1$ and 97 ppb of type $B_2$. The defatted flakes were ground or milled to a flour consistency and 650 gm. of the flour was suspended in 6500 mls. of water which was adjusted to a pH of 10.3 with 50% sodium hydroxide. The mixture was held at ambient temperature and extracted for about 30 minutes. Following extraction the undissolved solids were removed from the mixture by centrifugation. After the undissolved solids were removed the suspension was clarified by centrifugation to provide 4988 grams of an alkaline extract having a pH of about 10.3. The remainder of the experiment followed the procedure recited in Example 6 in that three samples of the peanut flour alkaline extract were taken. Sample (A) was used as a control and the aflatoxin content of the protein isolate curd was determined without the benefit of the process of the instant invention. Samples (B) and (C) were successive 1000 ml. fractions of the alkaline extract which was passed through an activated carbon column identical to the one described in Example 6. The aflatoxin content of the dried peanut isolate was measured by the method shown in Sections 26.015 – 26.020, *Official Methods of Analysis, Association of Analytical Chemists*, 11th Edition, 1970. The aflatoxin content of the isolate products is shown in Table 4.

TABLE 4

| | Sample | Aflatoxin Content | | | |
|---|---|---|---|---|---|
| | | Type $B_1$ µ/g per Kg flour | Percent by Weight | Type $B_2$ µ/g per Kg flour | Percent by Weight |
| (A) | Initial Flour | 580 | | 97 | |
| | Untreated Isolate | 520 | 100 | 80 | 100 |
| (B) | Carbon Column Isolate | 22 | 4.2 | 6 | 7.5 |
| (C) | Carbon Column Isolate | 79 | 15.2 | 12 | 15.0 |

Again, it may readily be seen that the isolate product of the instant invention has a substantial reduction of aflatoxin content when compared with the control peanut isolate product (A).

The above Examples are merely illustrative of the instant invention and it will be understood that various other changes in the details, materials or steps which have been described may be made without departing from the spirit of the instant disclosure, and such changes or other modifications are intended to be included within the scope of the instant disclosure and appended claims.

I claim:

1. A process for the production of a protein extract from oilseeds which is substantially devoid of impurities comprising:
   a. extracting a ground substantially defatted oilseed material with an alkaline extractant to provide an alkaline protein extract having a pH of at least 8.5; and
   b. passing said alkaline extract through activated carbon to substantially remove impurities from said extract.

2. A process as set forth in claim 1 wherein said alkaline protein extract has a pH of at least about 9.5.

3. A process as set forth in claim 1 wherein said alkaline protein extract has a pH of at least about 10.0.

4. A process as set forth in claim 1 wherein said activated carbon has an ash content of less than about 8 percent by weight.

5. A process as set forth in claim 1 wherein said ground oilseed material is soybean.

6. A process as set forth in claim 1 wherein said ground oilseed material comprises substantially defatted soybean flakes.

7. A process as set forth in claim 6 wherein said flakes have an oil content less than about 2 percent by weight.

8. A process as set forth in claim 1 wherein said alkaline extractant is selected from the group consisting of sodium hydroxide, potassium hydroxide, calcium hydroxide and mixtures thereof.

9. A process as set forth in claim 1 wherein said extraction is carried out at an elevated temperature.

10. A process as set forth in claim 9 wherein said temperature is about 85° F.

11. A process as set forth in claim 1 wherein said extraction is carried out for at least about 30 minutes.

12. A process as set forth in claim 1 wherein said alkaline protein extract has a solids content of between about 3 to 5 percent by weight.

13. A process for the production of a protein product from oilseeds which is substantially free of impurities comprising:

a. extracting a ground substantially defatted oilseed material with an alkaline extractant to provide an alkaline protein extract having a pH of at least about 8.5,
b. passing said alkaline extract through activated carbon, and
c. lowering the pH of said extract to the isoelectric point of the protein to precipitate in the form of a damp mass, a protein product free of impurities.

14. A process as set forth in claim 13 wherein said ground oilseed material is soybean.

15. A process as set forth in claim 14 wherein said ground soybean material substantially comprises defatted soybean flakes.

16. A process as set forth in claim 15 wherein said protein mass is dried to provide a dry protein isolate which is substantially devoid of flavor and color.

17. A process as set forth in claim 15 wherein said flakes have an oil content less than about 2 percent by weight.

18. A process as set forth in claim 14 including the steps of dispersing said precipitated protein product in water at a solids level of between about 15 to 23 percent, and spray drying said dispersion to produce a dry protein isolate which is substantially devoid of flavor and color.

19. A process as set forth in claim 13 wherein said alkaline protein extract has a pH of at least about 9.5.

20. A process as set forth in claim 13 wherein said alkaline protein extract has a pH of at least about 10.0.

21. A process as set forth in claim 13 wherein said activated carbon has an ash content of less than about 8 percent by weight.

22. A process as set forth in claim 13 wherein said alkaline extractant is selected from the group consisting of sodium hydroxide, calcium hydroxide, potassium hydroxide and mixtures thereof.

23. A process as set forth in claim 13 including the step of washing said precipitated protein product with water.

24. A process as set forth in claim 13 wherein said extraction is carried out at an elevated temperature.

25. A process as set forth in claim 24 wherein said temperature is about 85° F.

26. A process as set forth in claim 13 wherein said extraction is carried out for at least about 30 minutes.

27. A process as set forth in claim 13 wherein said alkaline protein extract has a solids content of between about 3 to 5 percent by weight.

28. A process as set forth in claim 13 wherein the pH of said extract is lowered to about 4.5.

29. A process for the production of a protein product from oilseeds which is substantially devoid of impurities comprising:
a. extracting a substantially defatted oilseed material with an alkaline extractant to provide an alkaline protein extract having a pH of at least about 9.5;
b. passing said alkaline extract through activated carbon;
c. lowering the pH of said extract to the isoelectric point of the protein, thereby precipitating the protein as a damp mass; and
d. drying said protein mass to provide a dry protein isolate which is substantially devoid of impurities.

30. A process as set forth in claim 29 wherein said protein extract has a pH of at least about 10.0.

31. A process as set forth in claim 29 wherein said activated carbon has an ash content of less than about 8 percent by weight.

32. A process as set forth in claim 29 wherein said drying step is carried out after dispersal of said protein mass in water to provide a dispersion having a solids content of between about 15 to 23 percent.

33. A process as set forth in claim 29 wherein said extraction is carried out at an elevated temperature.

34. A process as set forth in claim 29 wherein said pH is lowered to about 4.5.

35. A process as set forth in claim 29 wherein said defatted oilseed material is defatted soybean.

36. A product produced by the process of claim 1.

37. A product produced by the process of claim 13.

38. A product produced by the process of claim 29.

* * * * *